United States Patent [19]

Tsuchida

[11] Patent Number: 5,193,089
[45] Date of Patent: Mar. 9, 1993

[54] KEY TELEPHONE SYSTEM

[75] Inventor: Shinji Tsuchida, Zama, Japan

[73] Assignee: Canon Kabushiki Kaisha, Tokyo, Japan

[21] Appl. No.: 443,151

[22] Filed: Nov. 30, 1989

[30] Foreign Application Priority Data

Dec. 1, 1988 [JP] Japan ................. 63-304666

[51] Int. Cl.$^5$ .................. H04J 3/02; H04M 1/26
[52] U.S. Cl. ..................... 370/84; 370/102; 379/94; 379/165
[58] Field of Search ........ 370/84, 112, 110.1, 370/109, 102; 379/164, 165, 157, 94

[56] References Cited

U.S. PATENT DOCUMENTS

| | | | |
|---|---|---|---|
| 4,658,397 | 4/1987 | Kawamura et al. | 370/65.5 |
| 4,805,165 | 2/1989 | Kawamura et al. | 370/112 |
| 4,893,310 | 1/1990 | Robertson et al. | 370/110.1 |
| 4,932,022 | 6/1990 | Keeney et al. | 379/165 |
| 4,942,600 | 7/1990 | Suzuki | 379/100 |
| 4,953,180 | 8/1990 | Fieschi et al. | 370/84 |
| 4,995,073 | 2/1991 | Okata et al. | 379/94 |

OTHER PUBLICATIONS

B. Jervis et al. "New Generation in Key System Design", Meridian Norstar; Telesis 1989 two pp. 5-20.

*Primary Examiner*—Douglas W. Olms
*Assistant Examiner*—Min Jung
*Attorney, Agent, or Firm*—Fitzpatrick, Cella, Harper & Scinto

[57] ABSTRACT

A key telephone system is provided with a main equipment including at least two extensions and at least one line wire which accommodates a digital line. The key telephone system is arranged to enable reciprocal data communications by effecting speed matching in data communications between a data terminal connected to the extension and the digital line accommodated in the line wire.

13 Claims, 10 Drawing Sheets

KEY TELEPHONE SYSTEM

BACKGROUND OF THE INVENTION

1. Field of the Invention

The present invention relates generally to a key telephone system and, more particularly, to a key telephone system which enables data communications over an integrated services digital network (ISDN) line.

2. Description of the Related Art

In the field of key telephone systems arranged to effect data communications over line wires which accommodate ISDN lines, a system has not yet been proposed which is equipped with a speed matching function (the function of effecting speed conversion prior to transmitting over a 64-Kbps ISDN line with a B channel data received at a low speed such as 9600 bps from a personal computer or the like.

The disadvantage of such a conventional system is that, even if the key telephone system is fully digitized and the ISDN line is accommodated in the line wire, it is impossible to realize data communications with a data terminal such as a personal computer connected to an extension of the system.

SUMMARY OF THE INVENTION

It is therefore an object of the present invention to provide a key telephone system which can solve the above-described problem.

It is another object of the present invention to provide a key telephone system which enables data communications with a connected data terminal over an ISDN line.

The other objects, features and advantages of the present invention will become apparent from the following detailed description, taken in conjunction with the accompanying drawings.

DESCRIPTION OF PREFERRED EMBODIMENTS

Preferred embodiments of the present invention are explained below with reference to the accompanying drawings.

Figure 1:
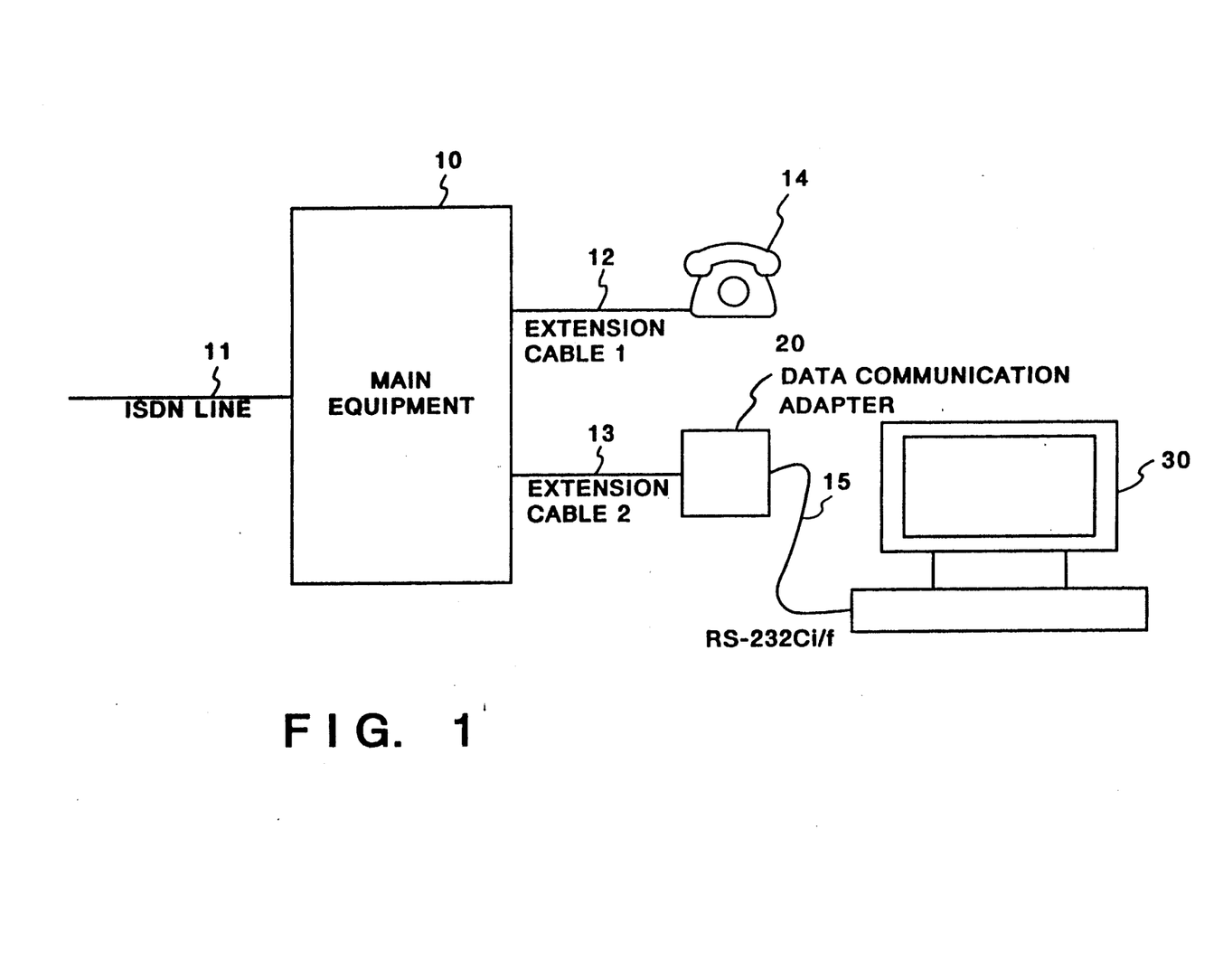
FIG. 1 is a block diagram showing the system construction of one embodiment of a key telephone system according to the present invention.

Explanation of System (FIG. 1)

FIG. 1 is a block diagram showing the system construction of a key telephone system according to a first embodiment. The illustrated key telephone system comprises a main equipment 10 arranged to form a talking path between a line wire and an extension which extend into the main equipment 10, and provides various kinds of control such as line switching or the like, and an ISDN line 11 which allows multiplexed transmission of two channels (B channels) and a single channel (D channel). The former two channels allow information communications at a transmission speed of 64 Kbps or less, while the latter single channel allows switching control signals or user's packets to be transmitted at a transmission speed of 16 Kbps. The illustrated key telephone system also comprises an extension cable 12 connected to an extension telephone 14, an extension cable 13 connected to a data communication adapter 20 which will be described later, and an RS-232CI/F cable 15 for connecting a personal computer 30 and the data communication adapter 20.

Figure 2:
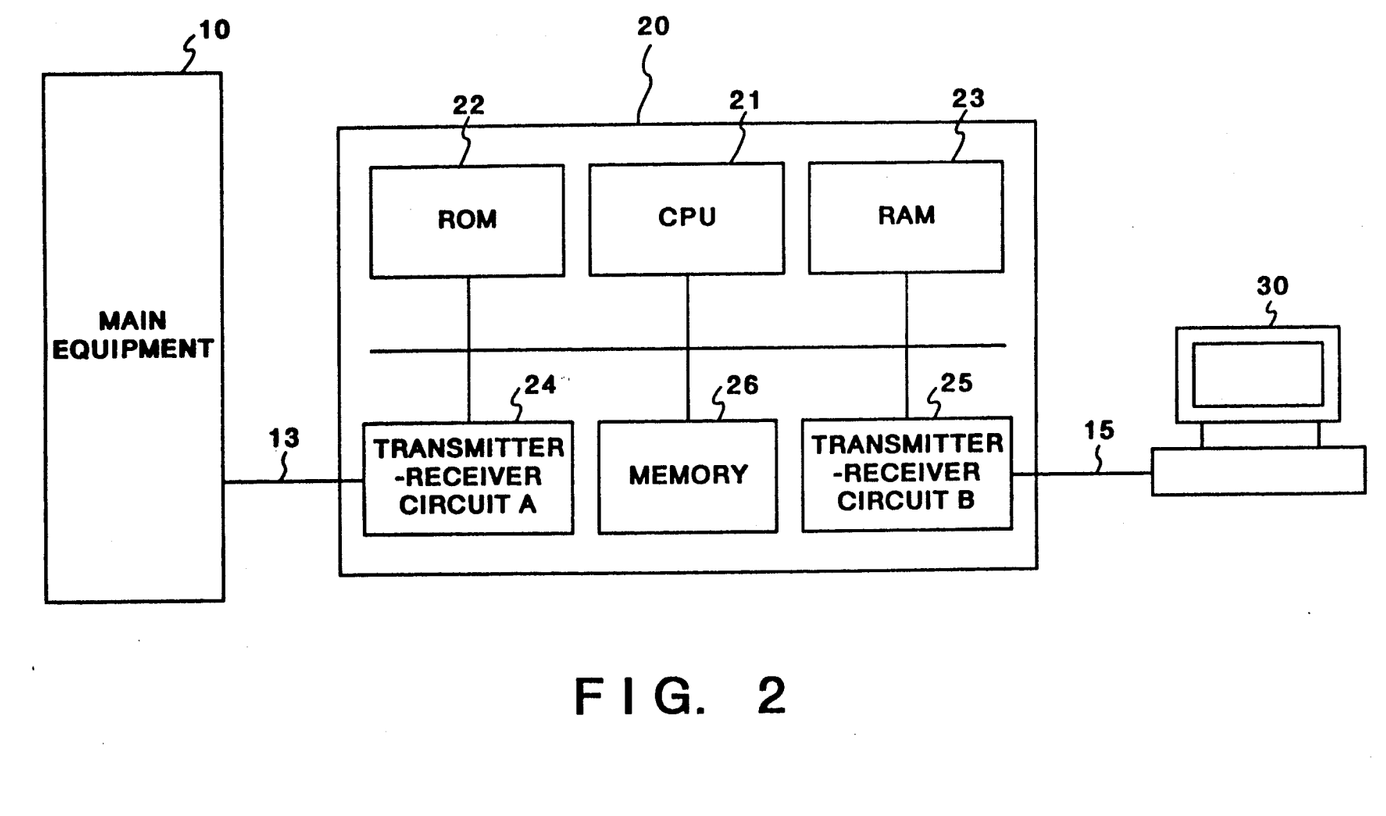
FIG. 2 is a block diagram showing a data communication adapter in the embodiment of the present invention.

Explanation of Data Communication Adapter (FIG. 2)

The first embodiment is explained with illustrative reference to an arrangement in which the data communication means 20 includes a speed matching means. FIG. 2 is a block diagram showing the data communication adapter 20.

As shown in FIG. 2, the data communication adapter 20 is made up of a CPU 21 for controlling all the processes in the adapter 20, including a speed converting process which will be described later, a ROM 22 which stores the procedure of each process executed by the CPU 21, a RAM 23 which serves as a work area for the CPU 21 while the CPU 21 is executing individual processes, a transmitter-receiver circuit A 24 for transmitting and receiving data to and from the main equipment 10 over the extension cable 13, a transmitter-receiver circuit B 25 for transmitting and receiving data to and from the personal computer 30 over the RS-b 232CI/F cable 15, and a memory 26 for buffering data to be transmitted and received data during the execution of a speed converting process which will be described later.

Explanation of Speed Conversion Process (FIGS. 3-8)

The speed converting process executed in the first embodiment is explained below with reference to the accompanying drawings.

For the purpose of illustration, it is assumed that the data transmission speed between the main equipment 10 and the transmitter-receiver circuit A 24 is fixed to 64 Kbps which supports ISDN-line B-channel mode, and that the data transmission speed between the personal computer 30 and the transmitter-receiver circuit B 25 is fixed to 9600 bps in comformity to the RS-232CI/F standards (8 bits, no parity).

Figure 3A:
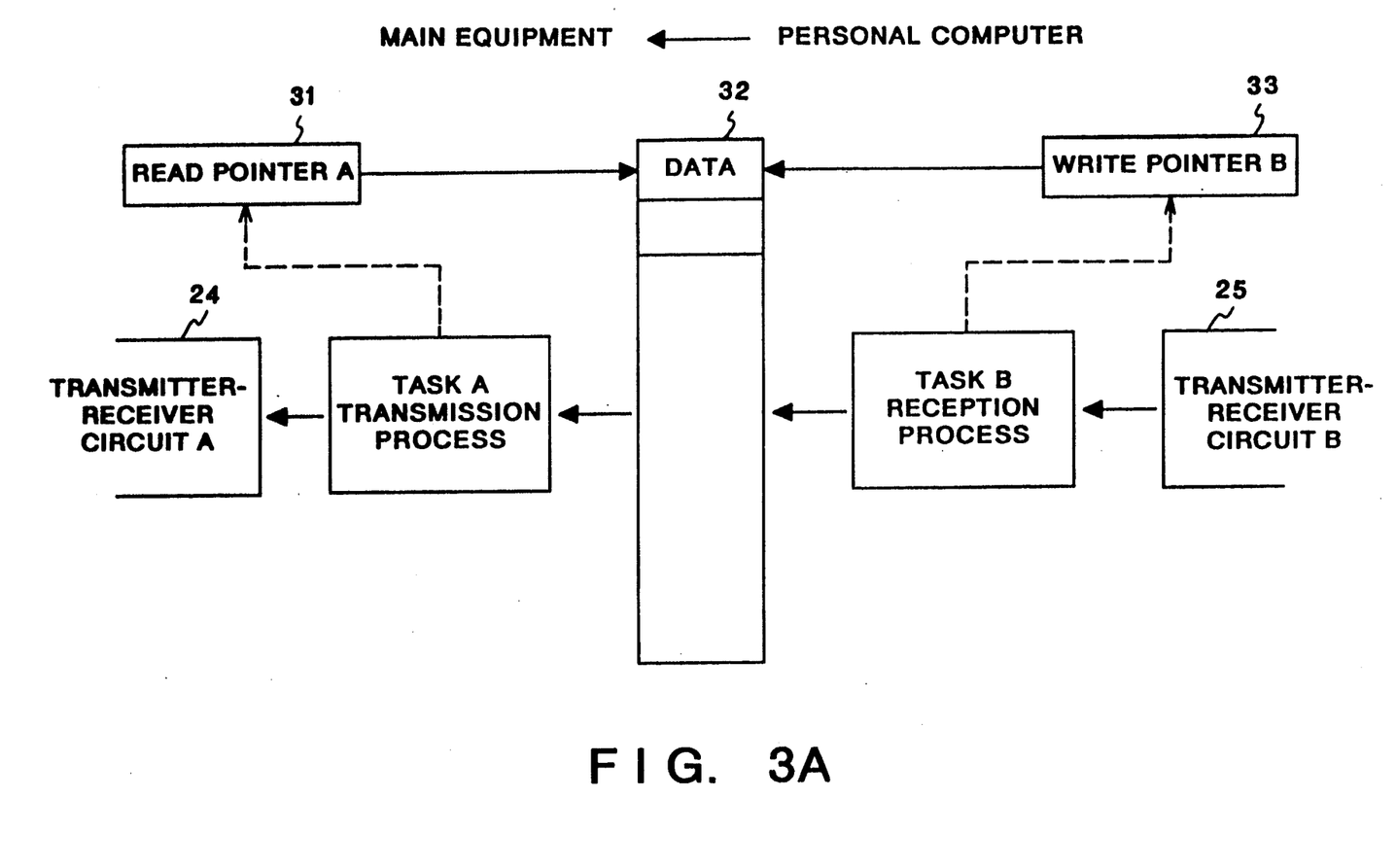
FIGS. 3A and 3B are block diagrams which serve to illustrate the stream of data in the embodiment.
Figure 3B:
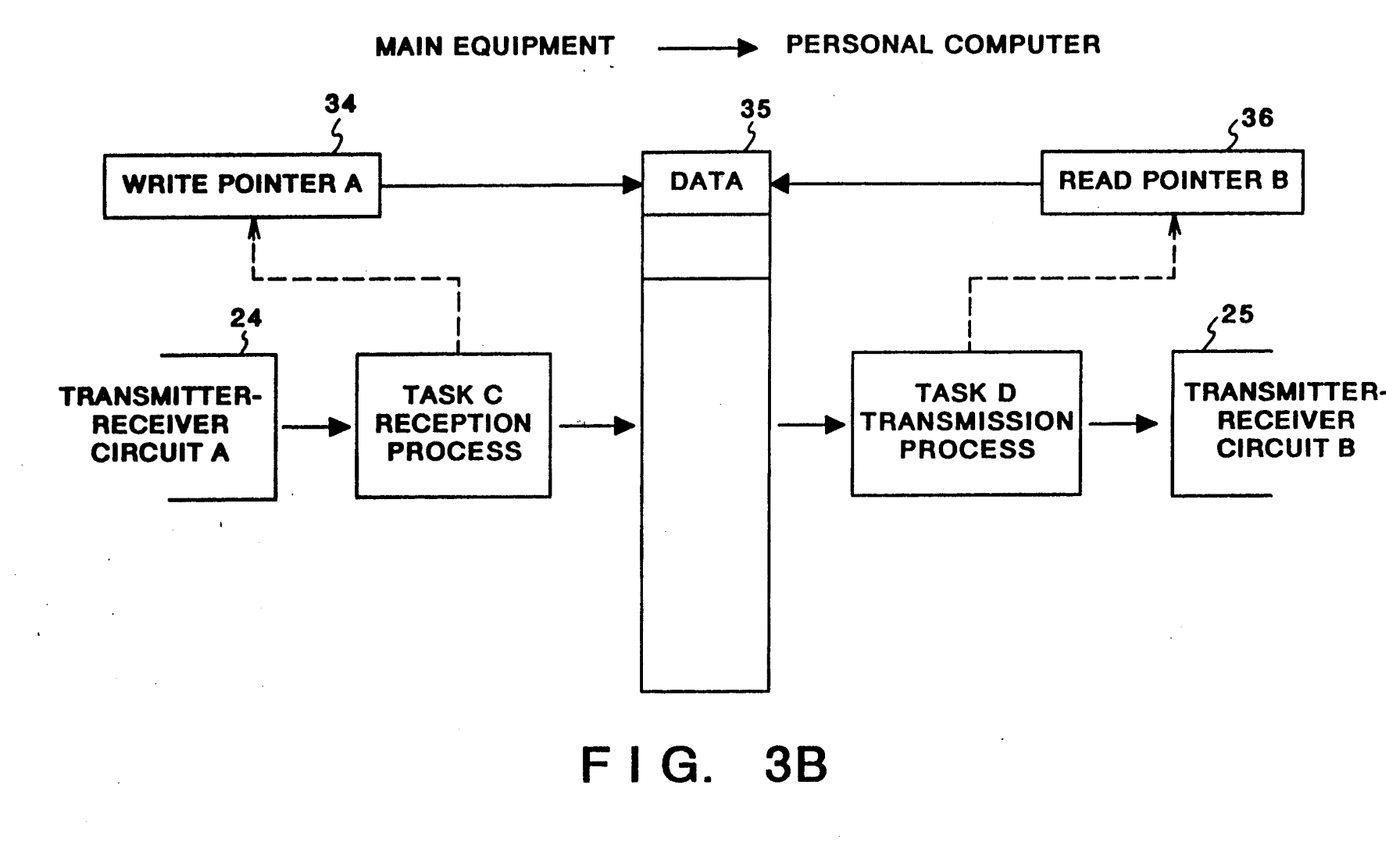
Figure 4:
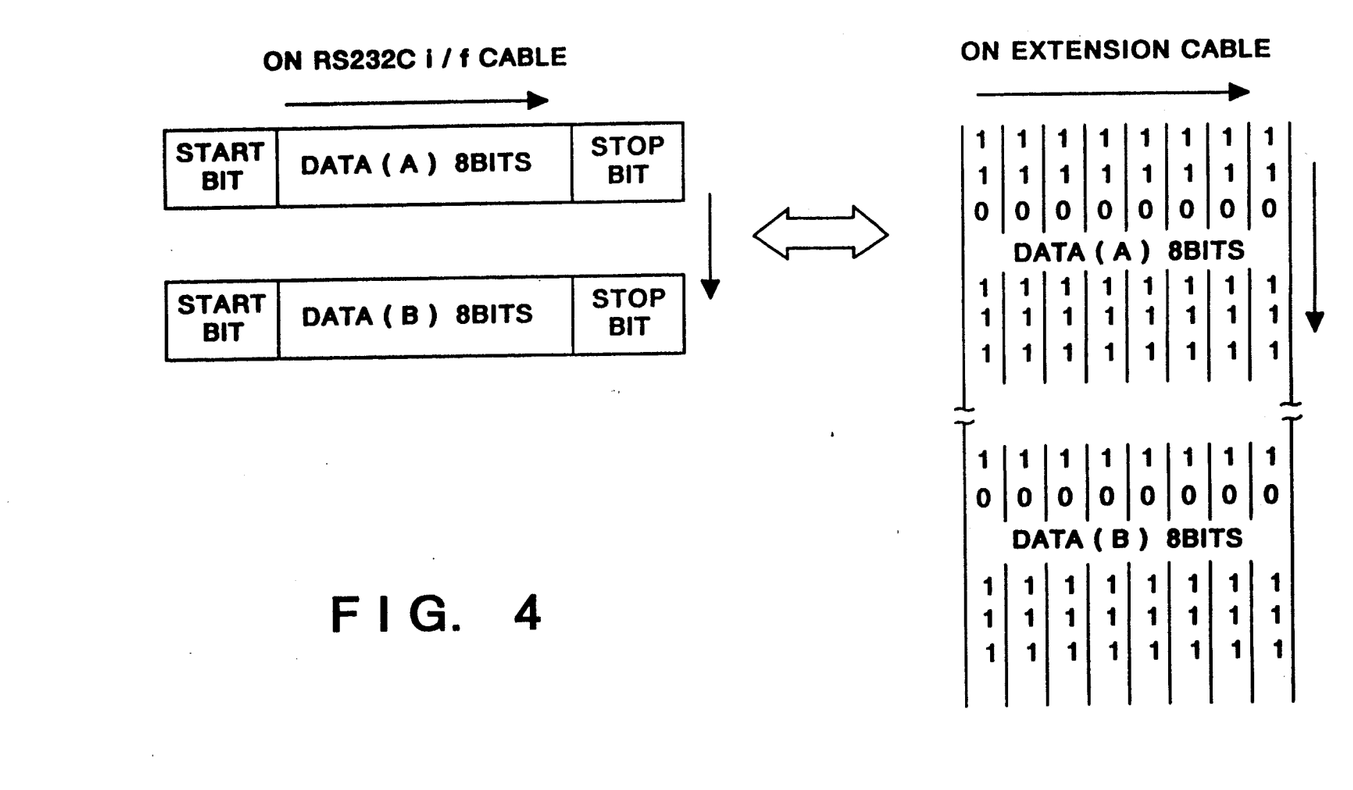
FIG. 4 is a view showing the data format adopted in the embodiment.

FIGS. 3A and 3B serve to illustrate the speed conversion process in the first embodiment along the stream of data. Referring to FIG. 3A, which is a view showing the stream of data from the personal computer 30 to the main equipment 10, when data from the personal computer 30 is received by the transmitter-receiver circuit B 25, a task B for executing a process associated with the reception of data is started and stores the received data at the location in a transmission-reception buffer 32 which is indicated by a write pointer B 33. In the meantime, a task A for executing a process independently of the task B for executing the above reception process makes a decision as to the presence or absence of received data in a transmission-reception buffer 32 in accordance with a read pointer 31 and the write pointer B 33. If it is determined that the data is present, the task A transmits through the transmitter-receiver circuit A 24 to the main equipment 10 data of "0" (8 bits, "00000000") which indicates that data to be subsequently transmitted is effective data. The task A then transmits the data in the transmission-reception buffer 32 which is indicated by the read pointer 31. If the result of the above decision indicates that no received data is present, the task A continues transmitting data of "1". FIG. 4 shows a data format for use in effecting data conversion associated with the above data transmission and data conversion associated with the reception of data from the main equipment 10, which will be described later.

More specifically, as shown in FIG. 4, a sequence of data of "1" is transmitted until 8-bit data (A) or (B) transmitted from the personal computer 30 is received. Then, when the 8-bit data (A) or (B) transmitted from the personal computer 30 is received, 8-bit data of "0" is transmitted and the 8-bit data is then transmitted from the personal computer 30.

In other words, in the above embodiment, in order to send out data transmitted from the personal computer 30 at a transmission speed of 9600 bps to the ISDN line at a transmission speed of 64 bps, speed matching is effected by transmitting pseudo data of "1" until the 8-bit data from the personal computer 30 becomes complete.

FIG. 3B shows the stream of data in the direction opposite to that of the above-described data stream, that is, from the main equipment 10 to the personal computer 30. When a task C for executing a reception process corresponding to that of the task A receives data of "0" from the main equipment 10, then the task C stores data, which will be subsequently received, at the location in a transmission-reception buffer 35 indicated by the write pointer 34. The task B for executing a process associated with the transmission of the received data makes a decision as to the presence or absence of data with reference to the write pointer 34 as well as a read pointer 36. If it is determined that data to be transmitted is present, the task B transmits to the personal computer 30 the data in the transmission-reception buffer 35 which is indicated by the read pointer 36.

The above-described tasks A, C and D are started by a timer (not shown) and their starting periods are set to appropriate values which correspond to their individual transmission speeds. Since a monitor or the like which realizes multi-task control in the first embodiment is known, no explanation is given. If the monitor or the like is used, the respective tasks can operate in parallel-processing mode.

In the above embodiment, the information settings required for data communication are fixed at 8 bits, no parity and 9600 bps. However, it is also possible to adopt an arrangement in which the settings information may be altered in accordance with the type of personal computer 30 connected.

Next, the process for transmitting data from the personal computer 30 to the main equipment 10 will be explained below with reference to the flow charts of FIGS. 5A, 5B, 6A and 6B.

Figure 5A:
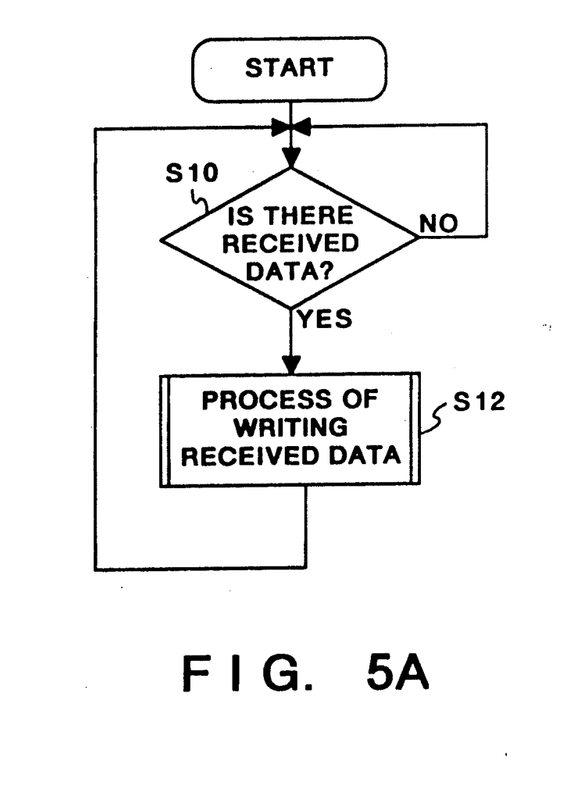
FIGS. 5A and 5B are flow charts showing a reception process directed to a personal computer in the embodiment.

The flow chart shown in FIG. 5A illustrates the process executed by the above task B. In Step S10, the CPU 21 waits for data to be supplied from the personal computer 30 and, if the CPU 21 receives a reception end signal through the transmission-reception circuit B 25, the process proceeds to Step S12, where the CPU 21 store the received data in the transmission-reception buffer 32. In this manner, each time new data is received, the process of writing of the received data is executed.

Figure 5B:
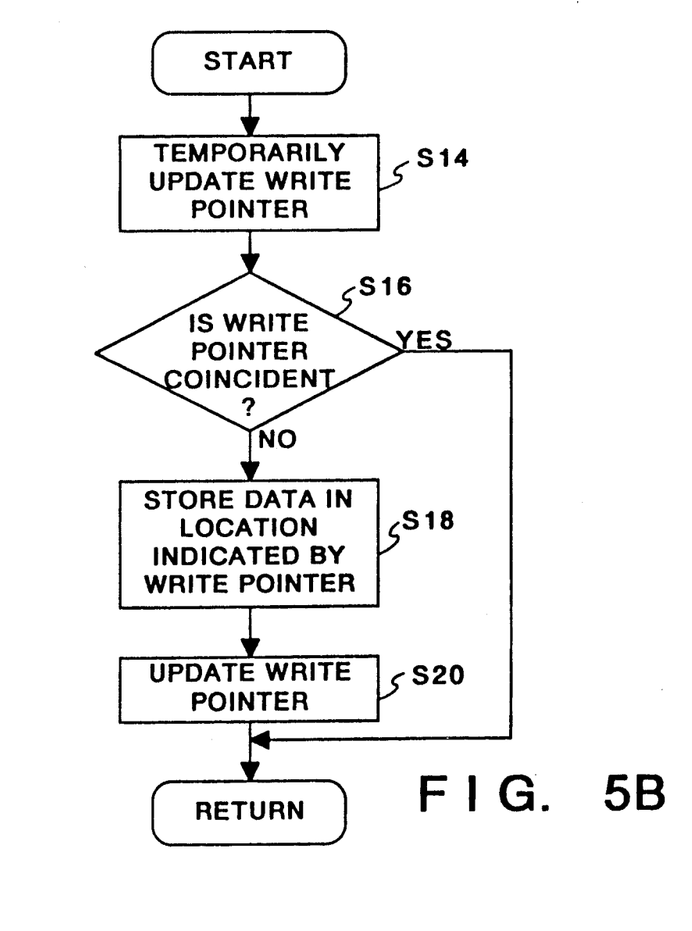

FIG. 5B is a flow chart which serves to illustrate such write process. In Step S14, the write pointer B 33 described above is temporarily updated and, in Step S16, a decision is made as to the presence or absence of an empty region in the transmission-reception buffer 32 by making a comparison with the read pointer 31. If an empty region is detected, the process proceeds to Step S18, where the data is stored at the location indicated by the write pointer 33. In Step S20, the write pointer 33 is updated and the process is returned to its starting step.

Figure 6A:
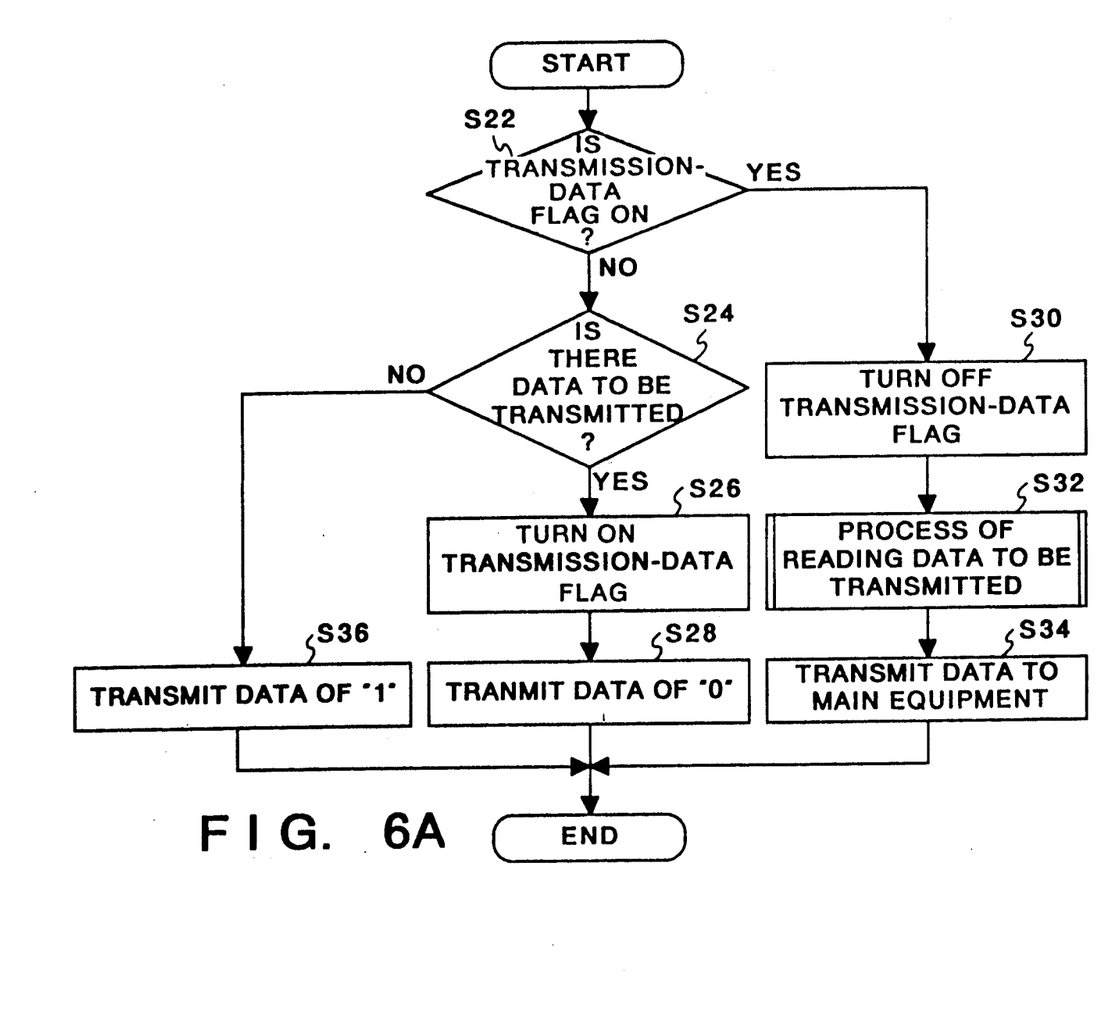
FIGS. 6A and 6B are flow charts showing a transmission process directed to a main equipment in the embodiment.

The process of the task A shown in FIG. 6A is explained below. First of all, in Step S22, from the state of the transmission data flag in the RAM 23, it is determined whether the data stored in the transmission-reception buffer 32 should be transmitted to the main equipment 10. If the flag is on, the process proceeds to Step S30, where the transmission data flag is turned off. Then, in Step S32, data to be transmitted is read from the transmission-reception buffer 32 and is then transmitted to the main equipment 10.

In the meantime, if it is determined in Step S22 that the flag is off, the process proceeds to Step S24, where a decision is made as to the presence or absence of data to be transmitted. This decision is made by comparing the read pointer 31 with the write pointer 33. If the read pointer 31 does not equal the write pointer 33, the process proceeds to Step S26, where the transmission data flag is turned on. In Step S28, data of "0" is transmitted to the main equipment 10. However, it is determined in Step S24 that data to be transmitted is absent, the process proceeds to Step S36, where data of "1" is transmitted to the main equipment 10.

Figure 6B:
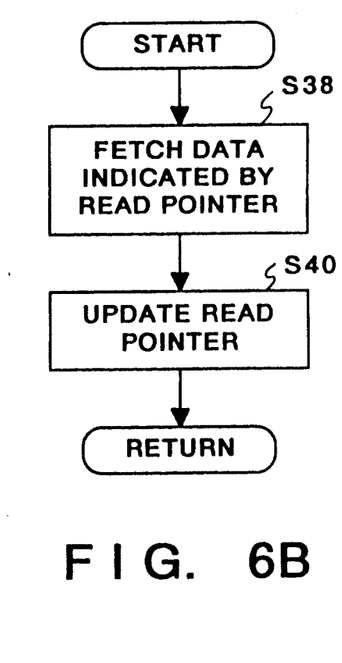

FIG. 6B is a flow chart showing the read process executed in Step S32. This process consists of a subroutine which includes Steps S38 and S40. In Step S38, the data indicated by the read pointer 31 is read from the transmission-reception buffer 32 and, in the following step S40, the read pointer 31 is updated, thus completing the subroutine. In order to execute a reentrant process, this subroutine is set by the task which calls the address of each pointer.

The process of transmitting data from the main equipment 10 to the personal computer 30 is explained with reference to the flow charts shown in FIGS. 7 and 8.

Figure 7:
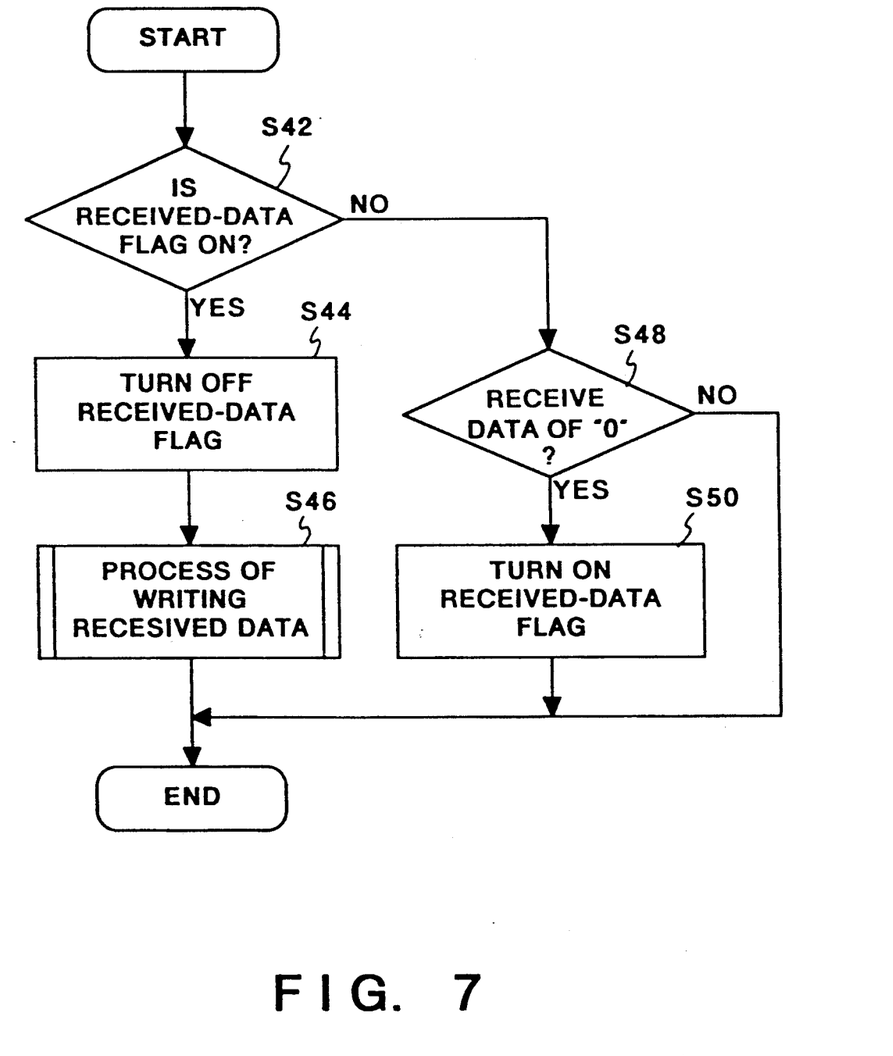
FIG. 7 is a view showing a reception process directed to the main equipment in the embodiment.

The flow chart shown in FIG. 7 illustrates the process of the task C described above. First of all, in Step S42, a decision is made as to the state of a received-data flag in the RAM 23, which represents reception or non-reception of data. If received data is present (flag on), the process proceeds to Step S44, where the received-data flag is turned off. Then, in Step S46, the process of data writing is executed.

On the other hand, if it is determined in Step S42 that the flag is off, the process proceeds to Step S48, where the state of the received data is examined. If effective data continues, it indicates that data of "0" has been received. In this case, in order to receive the next data and store it in the transmission-reception buffer 35, the process proceeds to Step S50, where the received data flag is turned on. However, if data of "1" is present, the process is terminated.

Figure 8:
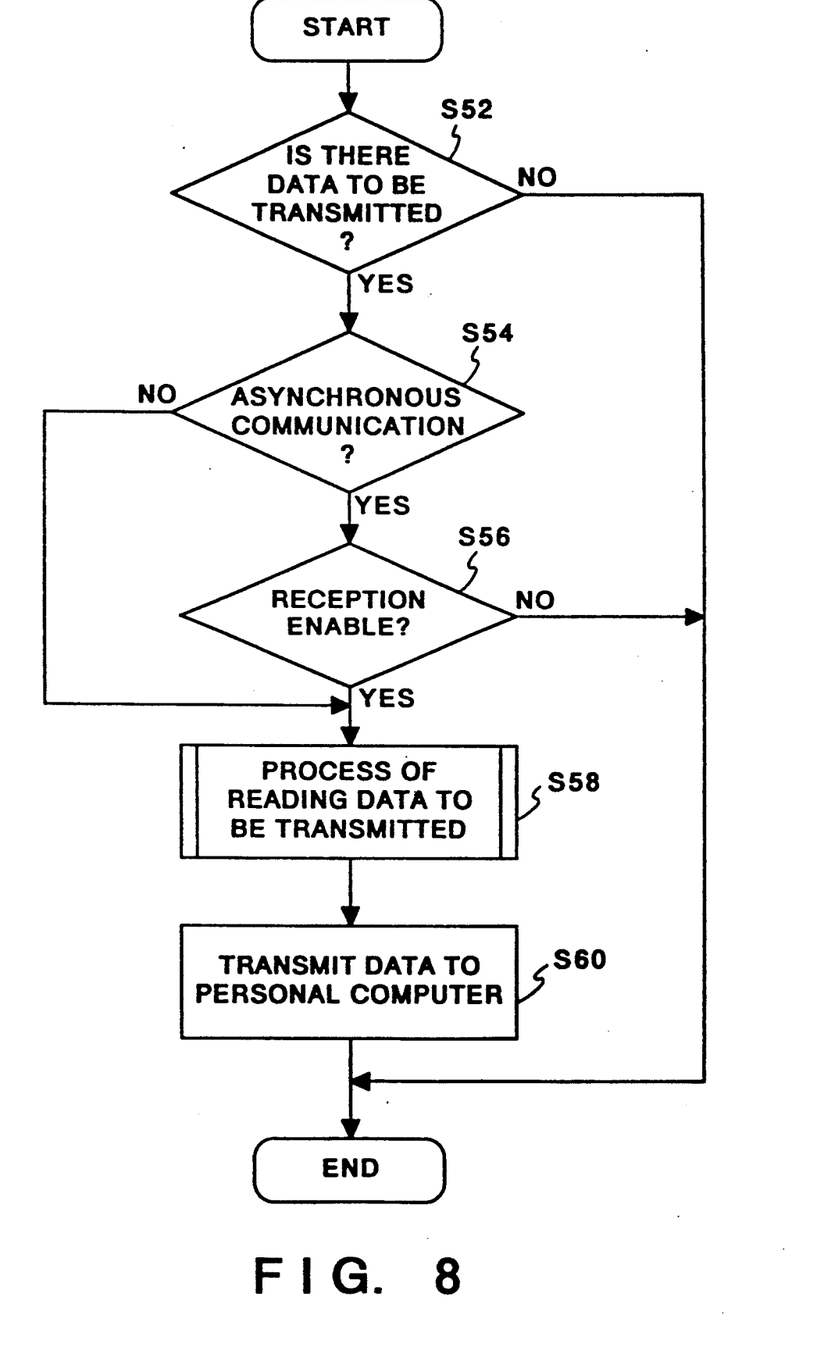
FIG. 8 is a flow chart showing a transmission process directed to the personal computer in the embodiment.

The flow chart of FIG. 8 shows the process of the task D described above.

In Step S52, a decision is made as to the presence or absence of data in the transmission-reception buffer 35 in a manner similar to that used in the decision of Step S24 shown in FIG. 6A. If data is present, the process proceeds to Step S4, where it is determined whether the system of communication with the personal computer 30 is a synchronous system or an asynchronous system. If the method is not the asynchronous system, the process proceeds to Step S58. In the case of the asynchronous system, the process proceeds to Step S56, where it is determined whether or not the personal computer 30 is in a reception-enable state. If the personal computer 30 is in the reception-enable state, the process proceeds to Step S58, where the above-described write process is executed. In the following step S60, desired data is transmitted to the personal computer 30, where the process is completed. However, if the answer is "NO" in Step S52 or S56, the process is immediately terminated.

In the above embodiment, since the data communication adapter 20 includes the speed matching means, the transmission speed between the ISDN line and the personal computer (data terminal) can be converted.

Another Embodiment

The above embodiment has been explained with reference to the arrangement in which the data communication adapter includes the speed matching means. The following is a description of another embodiment in which speed matching means is provided for each of the B channels of an ISDN line.

Figure 9:
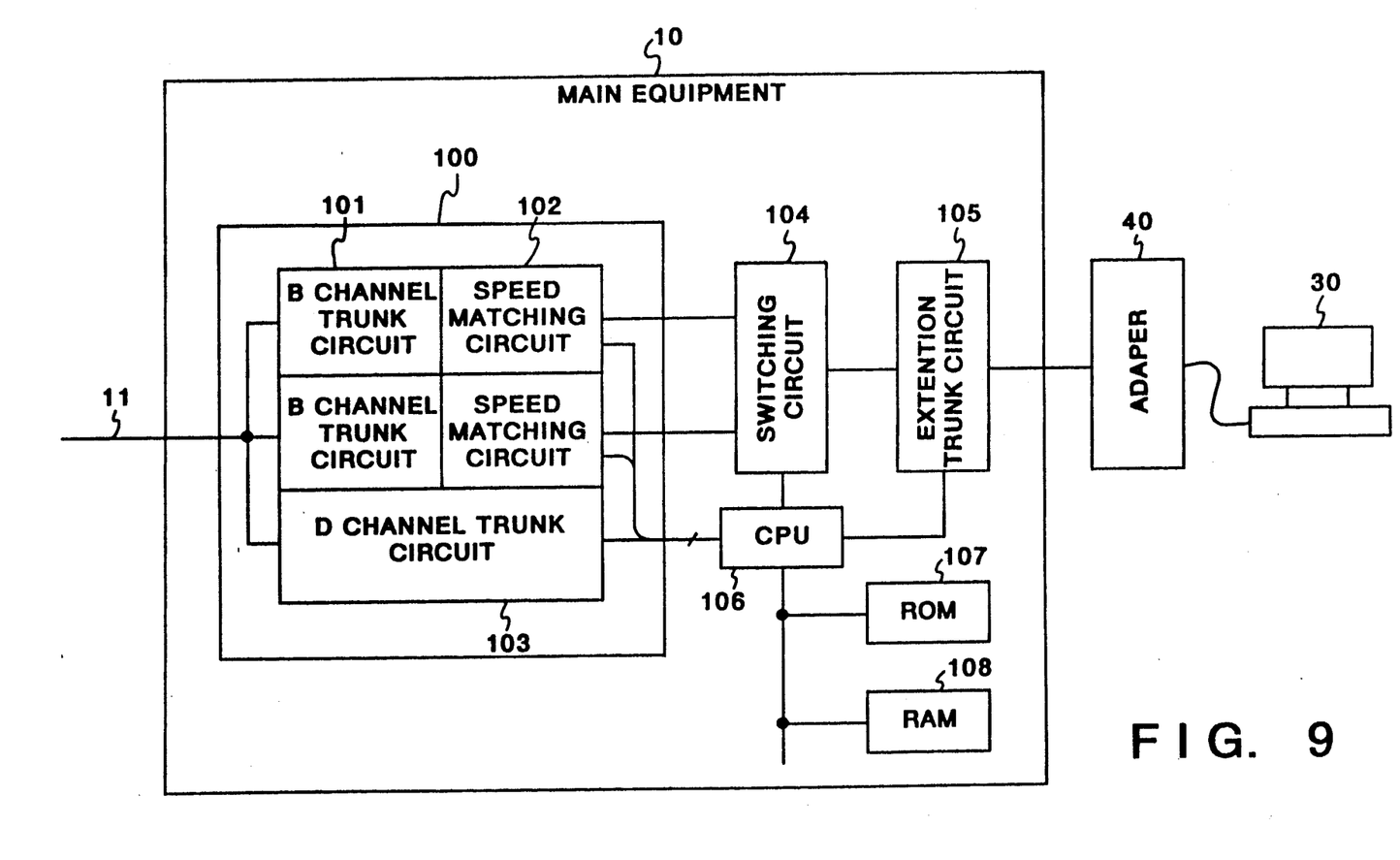
FIG. 9 is a block diagram showing the main equipment used in another embodiment of the present invention.

As shown in the block diagram of FIG. 9, in an ISDN trunk 100 (two B channels and one D channel) connected to the ISDN line, each B channel is provided with a speed matching circuit. With this arrangement, it is possible to connect the main equipment 10 to the personal computer 30 by means of a conventional type of adapter 40, instead of the above-described data communication adapter.

In FIG. 9, the main equipment indicated generally by 10 is made up of the ISDN trunk circuit 100 for connecting the ISDN line 11 with data link control as well as for controlling connection and disconnection of a call, a switching circuit 104 for effecting line switching, an extension trunk circuit 105 to which is connected the adapter 40, a CPU 106 for providing control over all the elements in the main equipment 10, a ROM 107 which stores the procedures of control executed by the CPU 106, and a RAM which includes a work area for the CPU 106, various kinds of tables and the like.

The ISDN trunk circuit 100 includes two B channel trunk circuits 101, speed matching circuits 102 associated with the respective B channel trunk circuits 101 and a D channel trunk circuit 103.

Each of the speed matching circuits 102 may be the same in construction as the data communication adapter 20 shown in FIG. 2, and the process procedures employed may be the same as the processes used in the above embodiment. However, if data communication with the personal computer 30 is to be executed, the CPU 106 instructs the speed matching circuit 102 to start the process thereof.

In the above embodiment, although the conventional adapter 40 is connected to an extension, it may not be connected if the conditions for connection with the personal computer 30 need not be altered.

In accordance with the above embodiment, since the speed matching circuit is provided for each B channel in the ISDN line within the main equipment, the entire system construction can be made simple.

As is apparent from the foregoing, in accordance with the present invention, since the speed matching means is provided in a key telephone system which receives an ISDN line, it is possible to realize data communication with a data terminal connected to an extension over the ISDN line.

While the invention has been described with reference to preferred embodiments, this description is solely for the purpose of illustration and is not to be construed as limiting the scope of the invention claimed below. On the contrary, various modifications may be made by those skilled in the art without departing from the true scope and spirit of the invention as defined by the appended claims.

What is claimed is:

1. A key telephone system connected to a digital line through which data is transmitted at a first transmitting speed, comprising:
   a plurality of extensions including an extension line through which data is transmitted at a second transmitting speed slower than said first transmitting speed;
   switching means for performing a connection and exchange between said plurality of extensions and said digital line; and
   converting means for converting the data transmitted at the second transmitting speed through said extension line into the data transmitted at the first transmitting speed, and for converting the data transmitted at the first transmitting speed through said digital line into the data transmitted at the second transmitting speed.

2. A key telephone system according to claim 1, wherein said converting means converts into the data transmitted at the first transmitting speed by adding a fill data to the data from the extension line in converting the data transmitted at the second transmitting speed from the extension line into the data transmitted at the first transmitting speed.

3. A key telephone system according to claim 2, wherein said converting means has a memory for storing data, said memory outputs said fill data when data stored in said memory from said extension line is less than a predetermined quantity of data, and outputs the data stored in said memory when the data is more than the predetermined quantity of data.

4. A key telephone system according to claim 2, wherein said digital line is an integrated services digital network.

5. A key telephone system according to claim 1, wherein said converting means includes a memory for storing data, and stores data transmitted at said first transmitting speed through said digital line and outputs the data stored in said memory by reading out at said second transmitting speed.

6. A key telephone system for exchanging data between a digital line and an extension line, and which accommodates the digital line for transmitting data at a first transmitting speed and a plurality of extensions including an extension line for transmitting data at a second transmitting speed slower than said first transmitting speed, comprising:

converting means for converting data transmitted at said second transmitting speed through the extension line into data transmitted at said first transmitting speed, wherein said converting means includes means for converting into the data transmitted at the first transmitting speed by adding fill data to the data transmitted at the second transmitting speed.

7. A key telephone system according to claim 3, wherein said digital line is an integrated services digital network.

8. A key telephone system according to claim 6, wherein said converting means includes a memory for storing data, and outputs said fill data when data stored in said memory from said extension line is less than a predetermined quantity of data, and outputs the data stored in said memory when the data is more than the predetermined quantity of data.

9. A key telephone system according to claim 8, where in said converting means includes a write pointer for specifying a write address at which data is to be stored in said storage means and a read pointer for specifying a read address, and a control task for controlling each of said pointers.

10. A key telephone system connected to a digital line for transmitting data at a first transmitting speed, and which accommodates an extension telephone and a data terminal for transmitting data at a second transmitting speed slower than said first transmitting speed comprising:

a memory for storing data received at the second transmitting speed through said data terminal; and transmitting means for transmitting the data stored in said memory to said digital line at said first transmitting speed;

wherein said transmitting means transmits fill data to said digital line in proportion to the quantity of data stored in said memory.

11. A key telephone system according to claim 10, wherein said transmitting means transmits said fill data if the quantity of data is less than a predetermined quantity of data.

12. A data exchange method in a key telephone system, comprising the steps of:

receiving data at a first transmitting speed from a data terminal connected to an extension;

converting the received data into data transmitted at a second transmitting speed faster than the first transmitting speed by adding fill data to the data received from said data terminal connected to the extension; and transmitting the converted data transmitted at said second transmitting speed to a digital line accommodated in a line wire by a controlling exchange.

13. A data exchanging method according to claim 12, further comprising the step of converting the data transmitted at the second transmitting speed through said digital line into the data transmitted at the first transmitting speed and then transmitting to the data terminal.

* * * * *

UNITED STATES PATENT AND TRADEMARK OFFICE
CERTIFICATE OF CORRECTION

PATENT NO. : 5,193,089

DATED : March 9, 1993

INVENTOR(S) : SHINJI TSUCHIDA

Page 1 of 2

It is certified that error appears in the above-identified patent and that said Letters Patent is hereby corrected as shown below:

ON THE TITLE PAGE:

IN [56] REFERENCES CITED

Under U.S. PATENT DOCUMENTS, insert:
--5,001,744  3/1991  Nishino et al. ........ 379/93--.

IN THE DRAWINGS:

SHEET 7 OF 10

FIG. 6A, "TRANMIT" should read --TRANSMIT--.

SHEET 10 OF 10

FIG. 9, "ADAPER" should read --ADAPTER--.

COLUMN 2

Line 47, "RS-b 232CI/F" should read --RS-232CI/F--.
Line 62, "comformity" should read --conformity--.

COLUMN 3

Line 35, "64 bps," should read --64 Kbps,--.

COLUMN 4

Line 11, "store" should read --stores--.
Line 44, "it" should read --if it--.

COLUMN 5

Line 16, "Step S4," should read --Step S54,--.
Line 60, "RAM" should read --RAM 108--.

UNITED STATES PATENT AND TRADEMARK OFFICE
CERTIFICATE OF CORRECTION

PATENT NO. : 5,193,089
DATED : March 9, 1993
INVENTOR(S) : SHINJI TSUCHIDA

It is certified that error appears in the above-identified patent and that said Letters Patent is hereby corrected as shown below:

COLUMN 7

Line 27, "where in" should read --wherein--.

COLUMN 8

Line 2, "speed compris-" should read --speed, compris- --.
Line 16, "exchange" should read --exchanging--.

Signed and Sealed this

Fifth Day of April, 1994

Attest:

BRUCE LEHMAN

Attesting Officer    Commissioner of Patents and Trademarks